Figure 1:
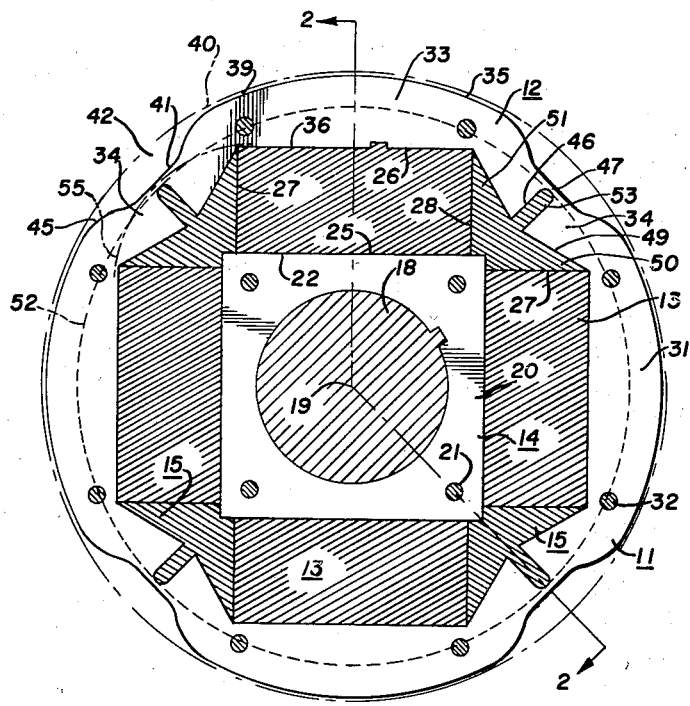

Dec. 2, 1958 W. J. MORRILL 2,863,077
DYNAMOELECTRIC FIELD STRUCTURE
Filed May 2, 1956

INVENTOR.
WAYNE J. MORRILL
BY
Woodling and Krost,
attys.

United States Patent Office 2,863,077
Patented Dec. 2, 1958

2,863,077

DYNAMOELECTRIC FIELD STRUCTURE

Wayne J. Morrill, Garrett, Ind.

Application May 2, 1956, Serial No. 582,277

14 Claims. (Cl. 310—156)

The invention relates in general to a field structure for dynamoelectric machines and more particularly to such a structure used as the rotating field of an electric generator.

Permanent magnet generators have been used for many years, especially in the smaller wattage sizes and the present invention relates to an improvement wherein improved flux distribution which moves relative to the armature conductors may be achieved in order to obtain a more sinusoidal output voltage. The permanent magnet generators must be protected against cross-magnetization and demagnetization caused by short circuits or heavy or changing currents in the armature winding in order to prevent demagnetization or weakening of a portion of the permanent magnets.

It is desirable to provide generators with stator armature windings of a low impedance to obtain good voltage regulation characteristics and such low impedance windings naturally are subject to very heavy currents on short circuits or overload. A large magnetomotive force is induced by such heavy currents which may be applied at right angles to the direction of the permanent magnet flux of the rotor to produce cross-magnetization of the pole face and this may result in demagnetization of a part of the permanent magnet. Also, under certain conditions heavy currents in the stator armature windings may cause a flux directly opposed to the permanent magnet flux of the rotor which, if allowed to pass through the permanent magnets in a reverse direction, will tend to demagnetize these magnets. This will result in a permanent reduction in the power output of the machine.

Therefore, an object of the present invention is to provide a permanent magnet field structure which establishes a nearly sinusoidal output voltage of the generator.

Another object of the invention is to provide a permanent magnet rotor for a generator utilizing permanent magnets of simple rectangular shape.

Another object of the invention is to provide a generator field structure which is simple and economical to construct.

Still another object of the invention is to provide a permanent magnet rotor with a smooth unbroken outer surface.

Still another object of the invention is to provide a permanent magnet rotor for a generator with a short circuit winding for protection against single phase short circuits on the generator.

Still another object of the invention is to provide a generator permanent magnet rotor with a magnetic bridge between pole faces which will saturate and therefore be a high reluctance to normal flux so that the normal flux will pass through the armature windings.

Another object of the invention is to provide a generator rotor field structure having permanent magnets to produce poles separated by a narrow slot in a permeable member so that such slot may be bridged by heavy cross-magnetization or demagnetization fluxes.

Another object of the invention is to provide a permanent magnet field structure for a generator wherein the permanent magnets are protected by an adjacently disposed laminated permeable member sufficiently thick to carry cross-magnetization fluxes so that such fluxes need not pass through the permanent magnets in order to have a flux path.

Still another object of the invention is to provide a cast squirrel cage structure physically holding in place all parts of a permanent magnet rotary field structure.

Still another object of the invention is to provide a thin magnetic bridge in a permanent magnet rotor structure which bridge is thin enough to have no appreciable deleterious effect on the available magnetic flux, yet which is so physically placed relative to integral annular permeable laminations that it provides sufficient tensile strength to hold together the rotor even during high speed conditions.

Figure 2:
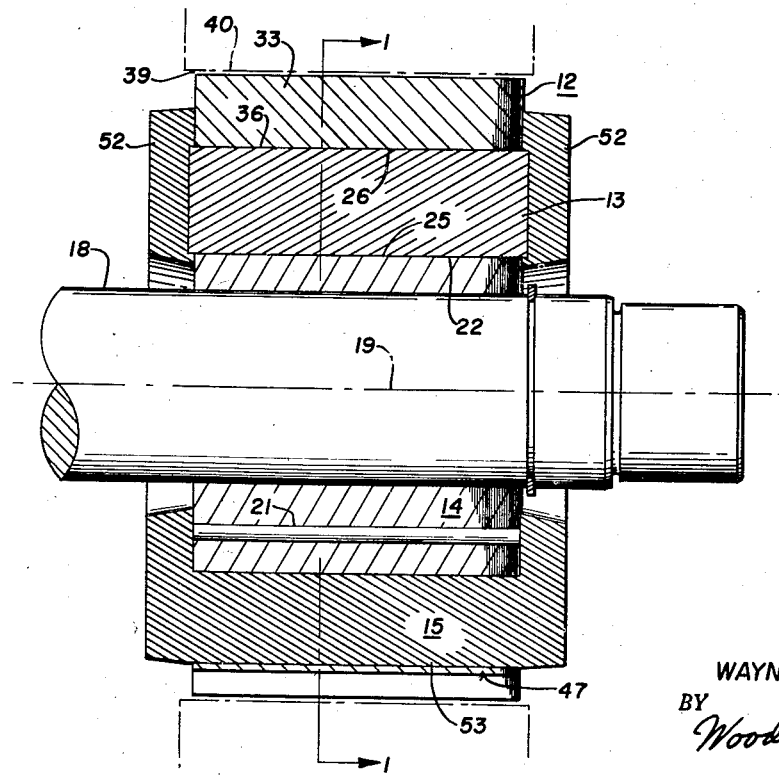

Other objects and a fuller understanding of this invention may be had by referring to the following description and claims, taken in conjunction with the accompanying drawing, in which:

Figure 1 is a sectional view through a permanent magnet rotor field structure according to the invention; and Figure 2 is a sectional view on the line 2—2.

The Figures 1 and 2 illustrate the preferred embodiment of the invention wherein the permanent magnet field structure is illustrated as a rotor 11. This rotor includes generally a stack of ring laminations 12, permanent magnets 13, a core 14, and a squirrel cage winding 15. The rotor 11 may be mounted on a shaft 18 having an axis 19. A stack of square core laminations 20 comprise the core 14. This stack may be held together by rivets 21 passing through suitable apertures in the stack. The core 14 has outer faces 22.

The invention has particular suitability to a four pole machine and consequently four permanent magnets 13 have been shown. These are of a rectangular solid shape having first and second planar faces 25 and 26 and opposed sides 27 and 28. The first faces 25 engage the outer faces 22 of the core 14 which in turn may be pressed upon the shaft 18.

The stack of ring laminations 12 is made up of identical laminations 31 with the stack again held together by rivets 32 and having pole face portions 33 and yokes 34. Each pole face portion 33 has an outer peripheral surface 35 which is generally cylindrical on a cylindrical arc from the axis 19 as an axis of revolution. The pole face portions 33 also have an inner surface 36 which is flat to engage the second faces 26 of the magnets 13. The stack 12 may thus be placed over the magnets 13 for tight engagement at the faces 25 and 26 of the magnets.

The cylindrical outer surfaces of the pole face portions 33 establish a uniform small air gap 39 relative to a stator shown diagrammatically at 40. The recessed yoke portions 34 have an outer surface 41 recessed inwardly from the stator 40 to provide a relatively large air gap 42.

The pole face portions 33 are integrally joined to the yoke portions 34 by chamfered edges 45 to provide a smooth unbroken surface throughout the peripheral extent of the stack of ring laminations 12. The yoke portions 34 include a deep narrow slot 46 extending outwardly from the inner surface of the rings toward the outer peripheral surface centrally disposed in each yoke portion. A thin magnetic bridge 47 is provided at the bottom of each slot integrally joining the two parts which make up the yoke portion 34. The inner peripheral surface 49 of the yoke portion together with the sides 27 and 28 of adjoining magnets and the corner portion of the core 13 define a generally triangular winding space 50. This winding space is adapted to contain the squirrel cage winding 15 and such winding may be formed by casting a conductive metal such as aluminum within this winding space. Such casting metal will completely fill this space to form axial bars 51. Four of these axial bars are provided in this four pole rotor and they are integrally joined with end rings 52 to complete the squirrel cage winding 15. A narrow tongue 53 extending within the slot 46 also forms a part of such axial bars.

As shown in Figure 1, the pole face portions 33 may have an arcuate extent of approximately one hundred six electrical degrees over which the air gap 39 is uniform. The yoke portions 34 are in the order of thirty electrical degrees for the mid-section where there is a large relatively uniform air gap 42. The chamfered edges 45 may be in order of twenty-two electrical degrees on a small radius. The pole face portion 33 helps to evenly distribute flux from the magnets 13 for uniform flux across the air gap and the chamfered edges 45 in effect widen the pole face portions 33 for a gradual lessening of the flux as one departs from the uniform air gap 39. This establishes a generally sinusoidal flux distribution pattern relative to the armature windings so that as the rotor 11 rotates a generally sinusoidal voltage will be developed in said armature windings.

*Operation*

The flux from the magnets 13 flows radially from such magnets through a pole face portion, through the stator 40 and returns through an adjacent pole face portion 33, an adjacent magnet and the core 14 to return to the initial magnet. A part of the flux threads through the yoke portion 34 and the integral magnetic bridges 47. Such bridges may be in the order of three-sixty-fourths of an inch in radial extent to be very easily saturated by the field strength of the magnets 13. This establishes a high reluctance in the magnetic bridges 47 to assure that normal flux from the magnets will flow through the stator 40 to cut the stator armature windings. The slots 46 are relatively narrow, being only about one-eighth of an inch in width, as shown, so that these slots provide a high reluctance to the normal flux to prevent short circuiting such flux. However, the slots 46 are sufficiently narrow so that, when heavy currents in the armature windings induce heavy demagnetization fluxes, such flux may bridge these slots 46 which will have a lower reluctance than the reluctance in the reverse direction of two of the magnets in series. Therefore, the yoke portions 34 provide a shunt for any demagnetizing fluxes caused by short circuits or heavy or changing currents in the armature windings.

The squirrel cage winding 15 provides a short circuiting winding for each pole face portion 33. Therefore, upon any attempted change in the flux through the pole face portion heavy circulating currents will be induced in such short circuiting windings to thus oppose the change of flux. This has been found to have a special advantage in providing a protection to the magnets from demagnetizing fluxes caused by single phase short circuits on a two or three phase stator armature winding.

Another feature of the squirrel cage winding 15 being cast is that it additionally provides rigid physical support for the entire structure, holding in place the magnets relative to the core 14 and ring laminations 12.

The magnets 13 may be of simple rectangular solid shape to be most economical to produce and assemble, thus providing an easily assembled and economical rotor. These magnets will be in the order of three-fourths of an inch thickness as shown for a rotor of nearly five inches outside diameter. The core 14 may be about two inches square, and since it may be square this again provides a rotor structure which is simple and economical to manufacture. The core 14 provides an internal path for the flux of adjacent magnets, as well as physically locating these magnets relative to the pole face portions 33. The radial thickness of the pole face portions 33 may be about five-eighths of an inch at the center which is approximating the thickness of the magnets, and therefore, this laminated pole face portion has sufficient thickness to carry heavy cross-magnetization flux so that such fluxes need not penetrate into the magnets 13 in order to have a flux path. This further protects the magnets from complete or partial demagnetization.

The magnetic bridges 47 are located on a smooth curve 55 which joins the inner surfaces 36 of the ring laminations 12. The physical positioning of these bridges at such location provides that the rotor 11 has high tensile strength to resist radially outward force such as caused by centrifugal force. A typical use of electric generators embodying this type of rotor is in railway freight or refrigerator car service wherein the generator is driven from the axle of the railway car. Freight cars rarely exceed a speed of sixty miles per hour but occasionally reach a speed of eighty miles per hour. A generator embodying this construction of rotor and with the magnetic bridges being only three-sixty-fourths of inch radial width has been successfully tested at speeds corresponding to railway car speeds of one hundred eight miles per hour and the rotor successfully resisted such centrifugal forces. Therefore, these bridges have been found to be sufficiently thin to provide high reluctance to the normal flux to the magnets 13, yet sufficiently strong to resist the centrifugal force encountered in service.

The axial bars 51 are relatively large in cross-sectional area and therefore, even when made of aluminum alloys, have sufficiently low resistance to be lower in impedance than that of the stator armature windings employed therewith. Therefore, any change in flux in the pole face portion will rapidly induce a very heavy circulating current in the squirrel cage winding 15 to oppose any such change in flux.

The slots 46 at approximately one-eighth of an inch width are narrow enough to provide good short circuit protection, yet wide enough to provide good generated voltage regulation. The short circuit protection is, of course, achieved by demagnetizing fluxes bridging such slots 46 as caused by heavy currents in the armature windings, yet the width of the slots is sufficiently wide to prevent the normal flux of the magnets from bridging these slots. This means that as the genereator armature windings are loaded and a counter-electromotive force is developed, this increases the effective reluctance of the stator. Yet for all normal fluxes the magnetic bridges 47 remain saturated and the slots 46 offer sufficiently high reluctance to be higher than that offered by the stator 40.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. A permanent magnet field structure for a dynamo-electric machine comprising, a stack of annular ring laminations having an axis and an unbroken outer surface, each of said ring laminations having four projecting pole face portions integrally joined by yoke portions recessed inwardly from a first cylindrical arc concentric with said axis and defining the outer surface of said pole face portions, an inner surface on each pole face portion, permanent magnet means in contact with said inner surfaces to establish said pole face portions as magnetic poles, a surface defining a narrow open slot deeper than the width thereof extending from the inside toward the outside of the ring centrally in each yoke portion, an integral magnetic bridge at the bottom of each said slot along the outermost periphery of said yoke portion, and a short circuiting winding for each pole face portion including conductors within the space inboard of said yoke portions.

2. A permanent magnet field structure for a dynamoelectric machine comprising, a permeable core having an axis, a stack of annular ring laminations having an unbroken outer surface, each of said ring laminations having projecting pole face portions integrally joined at chamfered edges by recessed yoke portions, said pole face portions having an outer surface substantially arcuate on a first cylindrical arc from said axis, an inner surface on each pole face portion, permanent magnets engaging the outer surface of said core and said inner surfaces to establish said pole face portions as magnetic poles, the outer peripheral surface on each said yoke portion being spaced inwardly from said first arc, the inner peripheral surface on each said yoke portion being spaced outwardly from said core and defining therewith a winding space, a surface defining a narrow open slot deeper than the width thereof extending outwardly from said winding space centrally in each yoke portion, an integral magnetic bridge as part of each said yoke portion at the bottom of each said slot along the outermost periphery of said yoke portion, a short circuiting winding on said rotor including axially parallel bars formed of a conductive metal within said winding space with an integral tongue on each bar extending into said slots to physically hold rigid said magnets, core, and stack of ring laminations.

3. A permanent magnet field structure for a dynamoelectric machine comprising, a permeable core having an axis, a stack of annular ring laminations having an unbroken outer surface, each of said ring laminations having four projecting pole face portions integrally joined at chamfered edges by recessed yoke portions, said pole face portions having an outer surface substantially arcuate on a first cylindrical arc from said axis, an inner surface on each pole face portion, four permanent magnets engaging the outer surface of said core and said inner surfaces to establish said pole face portions as magnetic poles, the outer peripheral surface on each said yoke portion being spaced inwardly from said first arc, the inner peripheral surface on each said yoke portion being spaced outwardly from said core and defining therewith a winding space, a surface defining a narrow open slot deeper than the width thereof extending outwardly from said winding space centrally in each yoke portion, an integral magnetic bridge as part of each said poke portion at the bottom of each said slot along the outermost periphery of said yoke portion, a short circuiting winding on said rotor including four axially parallel bars and two end rings, and said axial bars being formed of a conductive metal cast within said winding space with an integral tongue on each bar extending into said slots to physically hold rigid said magnets, core, and stack of ring laminations.

4. A permanent magnet rotor for a dynamoelectric machine comprising, a permeable core having an axis, a plurality of permanent magnets each in the shape of a rectangular solid, first and second faces on each of said magnets, said first faces being in engagement with said core and symmetrically placed thereon, a stack of peripheral annular ring laminations, each of said ring laminations having projecting pole face portions integrally joined at chamfered edges by recessed yoke portions, said pole face portions having an outer surface substantially arcuate on a first cylindrical arc from said axis, an inner surface on each pole face portion in contact with said second faces of said magnets, the outer peripheral surface on each said yoke portion being spaced inwardly from said first arc, a surface defining a narrow open slot deeper than the width thereof extending from the inside toward the outside of the ring centrally in each yoke portion, an integral magnetic bridge as part of each said yoke at the bottom of each said slot along the outermost periphery of said yoke portion, a squirrel cage winding on said rotor including axially parallel bars and two end rings, and said axial bars being formed of a conductive metal cast within the space formed by adjacent sides of two adjacent magnets and the outer surface of said core and the inner surface of said magnetic yoke portion with an integral tongue on each bar extending into said slots to physically hold rigid said magnets, core and stack of ring laminations.

5. A permanent magnet rotor for providing the field of a generator, said permanent magnet rotor comprising, a square permeable core having an axis, four permanent magnets each in the shape of a rectangular solid, first and second faces on each of said magnets, said first faces being in engagement with the four outer sides of said core, a stack of peripheral annular ring laminations having an unbroken outer surface, each of said ring laminations having four projecting pole face portions integrally joined at chamfered edges by recessed yoke portions, said pole face portions having an outer surface substantially arcuate on a first cylindrical arc from said axis, an inner surface on each pole face portion in contact with said second faces of said magnets, the outer peripheral surface on each said yoke portion being spaced inwardly from said first arc, a surface defining a narrow open slot deeper than it is wide extending from the inside toward the outside of the ring centrally in each yoke portion, an integral magnetic bridge as part of each said yoke portion at the bottom of each said slot along the outermost periphery of said yoke portion and being in the order of three-sixty-fourths of an inch in radial extent, a squirrel cage winding on said rotor including four axially parallel bars and two end rings, and said axial bars being formed of a conductive metal cast within the generally triangular space formed by adjacent sides of two adjacent magnets and the inner surface of said magnetic yoke portion with an integral tongue on each bar extending into said slots to physically hold rigid said magnets, core, and stack of ring laminations.

6. In a plural phase electrical generator of a given stator armature winding resistance, a permanent magnet rotor for providing the field of said generator comprising, a stack of square permeable laminations, a circular aperture in each of said laminations to permit said stack of laminations to be pressed on a shaft, four permanent magnets each in the shape of a rectangular solid, first and second planar faces on each of said magnets, said first faces being in engagement with the four outer faces of said stack of laminations, a stack of peripheral annular ring laminations, each of said ring laminations having four pole face portions integrally joined by yoke portions, said pole face portions having a substantially cylindrical outer surface substantially arcuate on a first arc from the center of said shaft to establish a small substantially uniform air gap with said stator, an inner surface on each pole face portion in contact with said second faces of said magnets, each of said yoke portions including a midsection with an outer peripheral surface spaced inwardly from said first arc for a much larger air gap and joined to the adjacent pole face portions by chamfered edges for gradual change of flux distribution at the ends of said pole face portions, a surface defining a narrow open slot centrally disposed in each yoke portion with substantially parallel sides and in the order of three times as deep as it is wide extending from the inside toward the outside of the ring, an integral magnetic bridge at the bottom of each said slot along the outermost periphery of each said yoke portion, said magnetic bridges lying on a smooth curve joining adjacent inner surfaces of said ring laminations for good tensile strength thereof to resist radially outward forces, a short circuiting winding on said rotor for each said pole face portion including four axially parallel bars within the generally triangular spaces formed by adjacent sides of two adjacent magnets and the inner surface of said magnetic yoke portion with an integral tongue on each bar extending into said slots, said bars maintaining said magnets and said stacks of laminations in rigid alignment, said short circuiting winding having a low impedance relative to said stator armature winding to afford protection to said magnets from demagnetization by single phase short circuits, and said magnets having sufficient field strength to saturate said magnetic bridges, whereby the radial thickness of said laminated pole face protects said magnets against cross-magnetization caused by rapid changes of current in the conductors of the stator armature winding, and said slots are wide enough to provide good generated voltage regulation by providing relatively high reluctance to flux from said magnets yet are narrow enough to provide good short circuit protection by providing a relatively lower reluctance than said magnets to any demagnetizing flux caused by said stator armature winding.

7. A permanent magnet rotor for providing the field of a generator having a stator armature winding and a plurality of phases, said permanent magnet rotor comprising, a stack of square permeable laminations having a width approximately forty percent of the diameter of the finished rotor, a circular aperture in each of said laminations to permit said stack of laminations to be pressed on a shaft, four permanent magnets of a rectangular solid shape of high retentivity and of considerable hardness and brittleness, first and second planar faces on each of said magnets spaced approximately three-fourths of an inch apart, said first faces being in engagement with the four outer faces of said stack of laminations, a stack of peripheral annular ring laminations, said magnets and said stacks having substantially the same axial length, each of said ring laminations having four pole face portions integrally joined by magnetic yoke portions, said pole face portions having a substantially cylindrical outer surface substantially arcuate for approximately one hundred thirty electrical degrees on a first arc from the center of said shaft and of a diameter in the order of five inches, an inner surface on each pole face portion in contact with said second faces of said magnets, each of said yoke portions being about fifty electrical degrees and including an outer peripheral surface diverging inwardly from said first arc to have a midsection spaced from said first arc approximately one-fifth of an inch, a surface defining a narrow open slot in the order of one-eighth of an inch extending from the inside toward the outside of the ring, an integral magnetic bridge at the bottom of each said slot along the outermost periphery of each said yoke portion and being in the order of three-sixty-fourths of an inch in radial extent, rivets extending axially through apertures in each said pole face portion and through apertures in said square laminations to hold together the said stacks of laminations, a cast aluminum squirrel cage on said rotor including four axial bars and two end rings, said axial bars being formed of aluminum cast within the generally triangular space formed by adjacent sides of two adjacent magnets and the inner surface of said magnetic yoke portion with an integral tongue on each bar extending into said slots, and a chamfered edge of about twenty electrical degrees on each of said pole face portions at the juncture of each said pole face portion and the adjacent integral magnetic yoke portion, and said magnets having sufficient field strength to saturate said magnetic bridges, whereby the radial thickness of said laminated pole face protects the permanent magnets in said rotor against cross-magnetization caused by rapid changes of current in the conductors of the stator armature winding, and whereby said squirrel cage winding protects the permanent magnets from a single phase short circuit on said stator armature winding, and said slots are narrow enough to provide good short circuit protection yet wide enough to provide good generated voltage regulation.

8. A rotor for a dynamoelectric machine comprising, a rectangular permeable core having an axis, a plurality of permanent magnets of a rectangular solid shape, first and second planar faces on each of said magnets, said first faces being in engagement with an outer face of said core and symmetrically placed relative to said core, a stack of peripheral annular ring laminations, each of said ring laminations having a plurality of pole face portions integrally joined by yoke portions, said pole face portions having an outer surface substantially arcuate on a first arc from said axis and having an inner surface in contact with said second faces of said magnets, each of said yoke portions including an outer peripheral surface spaced inwardly from said first arc and joined to said pole face portions by a chamfered edge on each of said pole face portions, a surface defining a narrow slot extending from the inside toward the outside of the ring, an integral magnetic bridge as part of each said yoke portion at the bottom of each said slot, a cast aluminum squirrel cage on said rotor including axial bars and two end rings, and said axial bars being formed of aluminum cast within the space formed by adjacent sides of two adjacent magnets and the inner surface of said yoke portion with an integral tongue on said bar extending into said slots.

9. A permanent magnet rotor for a dynamoelectric machine comprising, a stack of square permeable laminations, a circular aperture in each of said laminations to permit said stack of laminations to be pressed on a shaft, four permanent magnets of a rectangular solid shape, first and second planar faces on each of said magnets, said first faces being in engagement with the four outer faces of said stack of laminations, a stack of peripheral annular ring laminations, each of said ring laminations having four pole face portions integrally joined by magnetic yoke portions, said pole face portions having an outer surface substantially arcuate on a first arc from the center of said shaft and having an inner surface in contact with said second faces of said magnets, each of said yoke portions including an outer peripheral surface diverging inwardly from said first arc, a surface defining a narrow open slot extending from the inside toward the outside of the ring, an integral magnetic bridge as part of each said yoke portion at the bottom of each said slot, rivets extending axially through apertures in each said pole face portion to hold the stack of ring laminations together, a cast aluminum squirrel cage on said rotor including four axial bars and two end rings, said axial bars being formed of aluminum cast within the generally triangular spaces formed by adjacent sides of two adjacent magnets and the inner surface of said magnetic yoke portion with an integral tongue on each bar extending into said slots, and a chamfered edge on each of said pole face portions at the juncture of each said pole face portion and the adjacent integral magnetic yoke.

10. A permanent magnet field structure for a dynamoelectric machine having an armature comprising, a stack of ring-shaped laminations having an unbroken outer surface symmetrical with respect to an axis of revolution, pole face portions on said stack, each said pole face portion having an outer peripheral surface substantially coinciding with a cylindrical arc having said axis as an axis of revolution, chamfered edges on each said pole face portion, recessed yoke portions integrally joining the chamfered edges of each said pole face portion, inner surfaces on said stack of ring laminations directly radially inwardly disposed relative to said pole face portions, permanent magnets each having a face in engagement with said inner surfaces, means to prevent cross-magnetization of said pole face portions due to rapid changes of current and heavy currents in said stator armature winding, means to protect said magnets from demagnetization caused by single phase short circuits, means for physically holding said magnets and stack of laminations in place, means located on a smooth curve relative to said inner surface to provide high tensile strength to said rotor in an outwardly radial direction, means to establish a nearly sinusoidal flux distribution as applied to the armature windings of said machine, means for establishing a normal flux path from said magnets through one said pole face portion, through the machine armature to an adjacent pole face portion and another magnet, and means for establishing a shunt through said recessed yoke portions for demagnetizing fluxes established by heavy currents in said stator armature windings to prevent the demagnetizing flux from traversing said magnets in a reverse direction.

11. A permanent magnet rotor for providing the field of a generator of a plurality of phases and having a stator armature winding of a given resistance, said rotor including a stack of ring-shaped laminations having an unbroken outer surface symmetrical with respect to an axis of rotation, four pole face portions on said stack, each said pole face portion having an outer peripheral surface coinciding with a cylindrical arc having said axis as an axis of revolution, chamfered edges on each said pole face portion of approximately twenty electrical degrees extent, recessed yoke portions integrally joining the chamfered edges of adjacent pole face portions, four flat inner surfaces on said stack of ring laminations directly radially inwardly disposed relative to said pole face portions, a permeable core coaxially disposed in said stack of laminations, four permanent magnets each having first and second faces with said first faces in engagement with said core and said second faces in engagement with said flat inner surfaces, means including the radial depth of said pole face portions being in the order of the radial depth of said magnets to prevent cross-magnetization of said pole face portions due to rapid changes of current and heavy currents in said stator armature winding, means including a cast squirrel cage winding consisting of a short circuiting winding around each said pole face portion to protect said magnets from demagnetization caused by single phase short circuits, means including said squirrel cage winding for physically holding said magnets, core, and stack of laminations in place, a narrow and deep slot extending outwardly from the inner periphery of said ring centrally in each yoke portion to establish a thin magnetic bridge between adjacent pole face portions, means including said magnetic bridges being located on a smooth curve relative to said inner surface to provide high tensile strength to said rotor in an outwardly radial direction, means including said recessed yoke portions and chamfered edges to establish a nearly sinusoidal flux distribution as applied to said stator windings upon rotation of said rotor, means including said thin magnetic bridges for establishing a normal flux path from one of said magnets through one said pole face portion, through said stator to an adjacent pole face portion and another magnet and said core, and means including said narrow slot for establishing a shunt through said recessed yoke portions for demagnetizing fluxes established by heavy currents in said stator armature windings to prevent the demagnetizing flux from traversing said magnets in a reverse direction.

12. In an electrical generator, a permanent magnet rotor for providing the field of said generator comprising, a stack of peripheral annular ring laminations, each of said ring laminations having a plurality of pole face portions integrally joined by yoke portions, permanent magnet means establishing said pole face portions as magnetic poles, a surface defining a narrow open slot centrally disposed in each yoke portion with substantially parallel sides and in the order of three times as deep as it is wide extending from the inside toward the outside of the ring, an integral magnetic bridge at the bottom of each said slot along the outermost periphery of each said yoke portion, and said magnet means having sufficient field strength to saturate said magnetic bridges, whereby the radial thickness of said laminated pole face protects said magnet means against cross-magnetization caused by rapid changes of current in the generator, and said slots are wide enough to provide good generated voltage regulation by providing relatively high reluctance to flux from said magnet means yet are narrow enough to provide good short circuit protection by providing a relatively lower reluctance than said magnet means to any demagnetizing flux caused by current in said generator.

13. In an electrical generator, a permanent magnet rotor for providing the field of said generator comprising, a stack of magnetically permeable annular ring laminations, each of said ring laminations having a plurality of pole face portions integrally joined by yoke portions, permanent magnet means establishing said pole face portions as magnetic poles, each of said yoke portions including a mid-section with an outer peripheral surface spaced inwardly from the arc of said pole face portions and joined to the adjacent pole face portions by chamfered edges for gradual change of flux distribution at the ends of said pole face portions, the radial dimension of said yoke portions approximating the radial dimension of said pole face portions, a surface defining a narrow open slot centrally disposed in each yoke portion with substantially parallel sides and in the order of three times as deep as it is wide extending from the inside toward the outside of the ring, an integral magnetic bridge at the bottom of each said slot along the outermost periphery of each said yoke portion, and said magnet means having sufficient field strength to saturate said magnetic bridges, whereby the radial thickness of said laminated pole face protects said magnet means against cross-magnetization caused by rapid changes of current in the generator, and said slots are circumferentially wide enough to provide good generated voltage regulation by providing relatively high reluctance to flux from said magnet means yet are circumferentially narrow enough and said yoke portions are radially wide enough to provide good short circuit protection by providing a relatively lower reluctance than said magnet means to any demagnetizing flux caused by current in said generator.

14. In an electrical generator of a given stator armature winding resistance, a permanent magnet rotor for providing the field of said generator comprising, permanent magnet means, a stack of peripheral annular ring laminations, each of said ring laminations having a plurality of pole face portions integrally joined by yoke portions, an inner surface on each pole face portion in contact with said magnet means, each of said yoke portions including a mid-section with an outer peripheral surface spaced inwardly from the arc of said pole face portions and joined to the adjacent pole face portions by chamfered edges for gradual change of flux distribution at the ends of said pole face portions, a surface defining a narrow open slot centrally disposed in each yoke portion with substantially parallel sides and in the order of three times as deep as it is wide extending from the inside toward the outside of the ring, an integral magnetic bridge at the bottom of each said slot along the outermost periphery of each said yoke portion, said magnetic bridges lying on a smooth curve joining adjacent inner surfaces of said ring laminations for good tensile strength thereof to resist radially outward forces, a short circuiting winding on said rotor maintaining said magnets and said stacks of laminations in rigid alignment, said short circuiting winding having a low impedance relative said stator armature winding to afford protection to said magnet means from demagnetization by single phase short circuits, and said magnet means having sufficient field strength to saturate said magnetic bridges, whereby the radial thickness of said laminated pole face protects said magnet means against cross-magnetization caused by rapid changes of current in the conductors of the stator armature winding, and said slots are wide enough to provide good generated voltage regulation by providing relatively high reluctance to flux from said magnet means yet are narrow enough to provide good short circuit protection by providing a relatively lower reluctance than said magnet means to any demagnetizing flux caused by said stator armature winding.

References Cited in the file of this patent
UNITED STATES PATENTS

| | | |
|---|---|---|
| 2,257,824 | Tognola | Oct. 7, 1941 |
| 2,493,102 | Brainard | Jan. 3, 1950 |